INVENTOR
Edward T. Peterson
BY
ATTORNEY

Feb. 21, 1950 E. T. PETERSON 2,498,448
APPROACH TABLE FOR TRANSFER OF METALLIC STOCK
Filed Feb. 14, 1947 12 Sheets-Sheet 9

INVENTOR
Edward T. Peterson
BY
ATTORNEY

Feb. 21, 1950 E. T. PETERSON 2,498,448
APPROACH TABLE FOR TRANSFER OF METALLIC STOCK
Filed Feb. 14, 1947 12 Sheets-Sheet 10

INVENTOR
Edward T. Peterson
BY
ATTORNEYS

Patented Feb. 21, 1950 2,498,448

UNITED STATES PATENT OFFICE 2,498,448

APPROACH TABLE FOR TRANSFER OF METALLIC STOCK

Edward T. Peterson, Reading, Pa.

Application February 14, 1947, Serial No. 728,429

12 Claims. (Cl. 198—24)

My invention relates to approach tables of the type used in connection with rolling mill cooling beds.

A purpose of my invention is to improve the control possible of stock moving on approach tables, thus permitting the operator to stop the progression of the stock more quickly and reliably and to accomplish kick-off with less uncertainty as to the kick-off position.

A further purpose is to permit the shortening of approach tables in certain installations by avoiding the necessity for extra approach table space to allow for uncertainties in kick-off position.

A further purpose is to permit more uniform braking stock travelling on an approach table and to provide for definite braking of forward progression, preferably by a rising apron, prior to kick-off.

A further purpose is to permit the mounting of kick-off arms on a vertically movable approach table frame and operation of the arms in elevated position of the frame, preferably from axially stationary shaft means.

A further purpose is to place the kick-off arms at one side of the approach table, to move the kick-off arms vertically with an apron and to operate the kick-off arms in elevated position by universal-joint push-rod connection with axially stationary cranks on a kick-off shaft.

A further purpose is to incline the axes of the approach table rollers so as to impart to the stock a lateral component assuring that the stock will be close to the kick-off arms at the side of the approach table when its longitudinal progression is stopped.

A further purpose is to guide an apron frame at a plurality of points for vertical movement and to elevate the frame, suitably carrying with it the approach table apron and kick-off means, by mechanism suitably of crank and link character operating adjacent the guiding points and desirably interconnected from one guiding point to another by connecting rods.

A further purpose is to elevate a frame supporting an approach table apron and kick-off means by a plurality of bell cranks having link connection to the frame and having connecting rod interconnection to one another.

A further purpose is to counterbalance the frame by spring means, preferably suitably preloaded and acting through a connecting rod on a plurality of elevating cranks spaced along the frame.

A further purpose is to avoid the possibility of failing to kick off comparatively thin stock due to the kick-off arms passing over the stock especially when the apron plates become worn.

A further purpose is to employ renewable inserts in the ends of the kick-off arms.

A further purpose is to employ rotatable renewable inserts which will take wear evenly in the ends of the kick-off arms.

Further purposes appear in the specification and in the claims.

In the drawings I have chosen to illustrate one only of the numerous embodiments in which my invention may appear, selecting the form shown from the standpoint of convenience in illustration, satisfactory operation and clear demonstration of the principles involved.

Figures 12 to 16 inclusive illustrate a variation in the apron plates and kick-off arms.

In the drawings like numerals refer to like parts.

Describing in illustration but not in limitation and referring to the drawings:

In connection with the rolling of metallic stock, such as the standard steel bars and shapes, including strips, it is normal practice to progress the stock during cooling from the rolls across a cooling bed or hot bed, in many cases specially designed to provide the rate of cooling desired, as for example by controlling the timing and the lateral association of stock in the form of packs or otherwise as in the case of pack annealing. Approach tables are widely used to move the stock longitudinally from the rolling mill to the cooling bed, and to kick off the stock laterally to begin the lateral progression across the cooling bed.

While this is the widest and most common use of approach tables, it will be understood that the approach table of the present invention may be employed for other purposes, as for example transfer tables used for transferring stock from one form of hot or cold working equipment to another or for transferring stock to equipment for forming or other special operations.

For the purpose of illustrating the preferred embodiment of the invention, I have shown my novel approach table in association with the preferred type of cooling bed, which may be of the character described and claimed in my U. S. Patent No. 1,834,728, granted December 1, 1931, for Hotbed.

The approach table 30 of the present invention receives stock moving longitudinally on any convenient mechanism 31, and, when the stock has progressed to the correct position, kicks it off laterally over stationary inclined guides 32 to a suitable pack transfer mechanism 33, from which the stock is transferred to a first series of cooling bed bars 34, then to a second series of cooling bed bars 35 and finally to a discharge conveyor 36. The sets of cooling bed bars and the discharge conveyor may be of any suitable character, and I will describe herein in general terms one equipment of this type conforming generally to my patent above referred to.

The inclined guides 32 are supported from a main frame 41 by longitudinal beams 42 which support transverse saddles 43, the other sides of which are mounted on longitudinal beams 44, again supported from the main frame 41.

Figure 5:
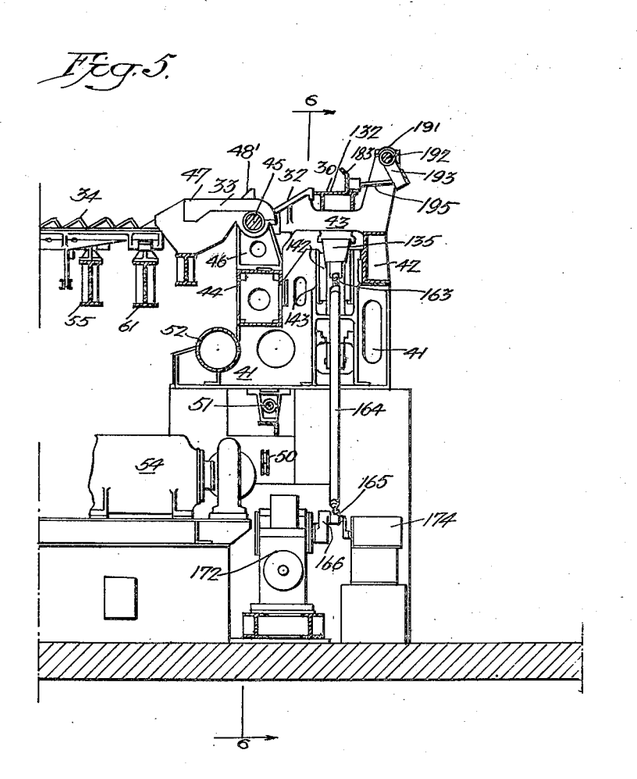
Figure 5 is a fragmentary section corresponding to Figure 3, but taken at the center of the approach table and showing the drive for raising and lowering the frame.

The pack transfer mechanism, not in itself part of the present invention, is pivoted on a horizontal shaft 45 mounted on benches 46 on the beam 44 which shaft oscillates the individual grate bars 47. Suitable tracks 48 guide dogs 48', movable longitudinally of the tracks in the direction of progression of the stock transversely across the cooling bed against suitable drag or resistance as well known in the art. The drag or resistance may conveniently be applied by a wire cable 49 passing down through pulleys 50 and then wound around a shaft 51 to which a counter-torque is applied by any suitable means such as a system of weights on a cable, not shown. The grate bars 47 are oscillated between the position shown in solid lines and the position shown in dot and dash lines in Figure 9 by a crank shaft 52 extending longitudinally with respect to the approach table, through connecting rods 53. The drive of the shaft 52 is conventionally indicated in Figure 5 by a motor 54 through conventional connections not shown.

Figure 1:
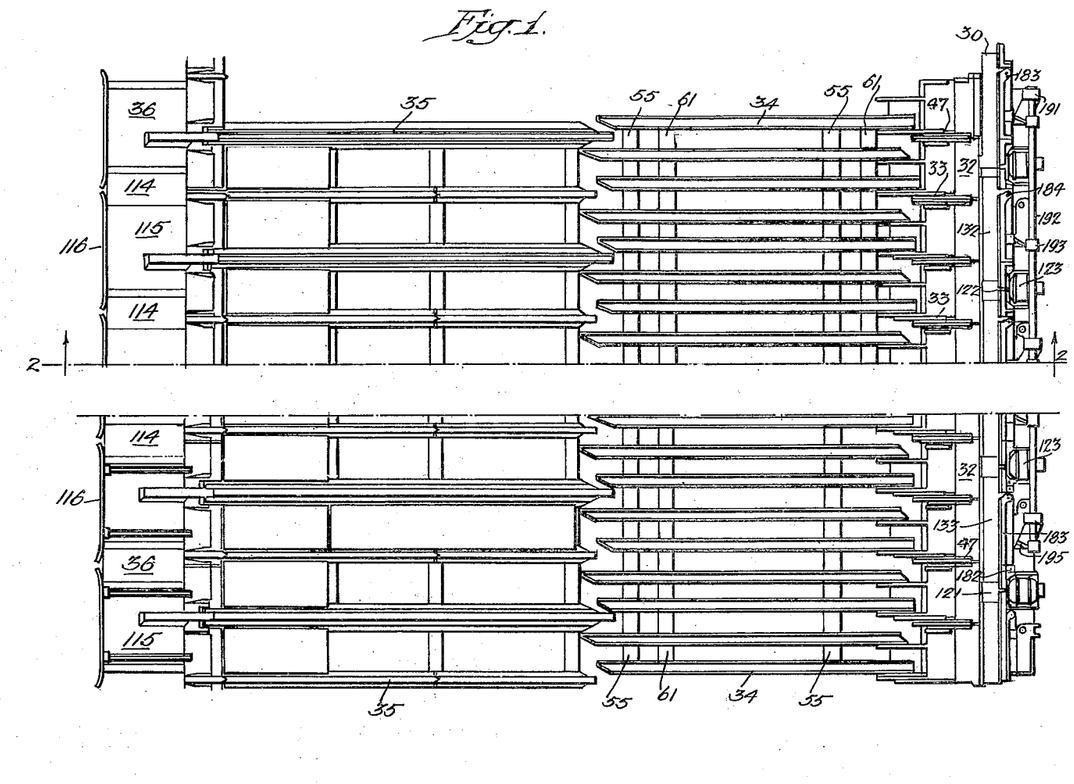
Figure 1 is a fragmentary top plan view illustrating the structure of my invention and associated cooling bed equipment.
Figure 2:
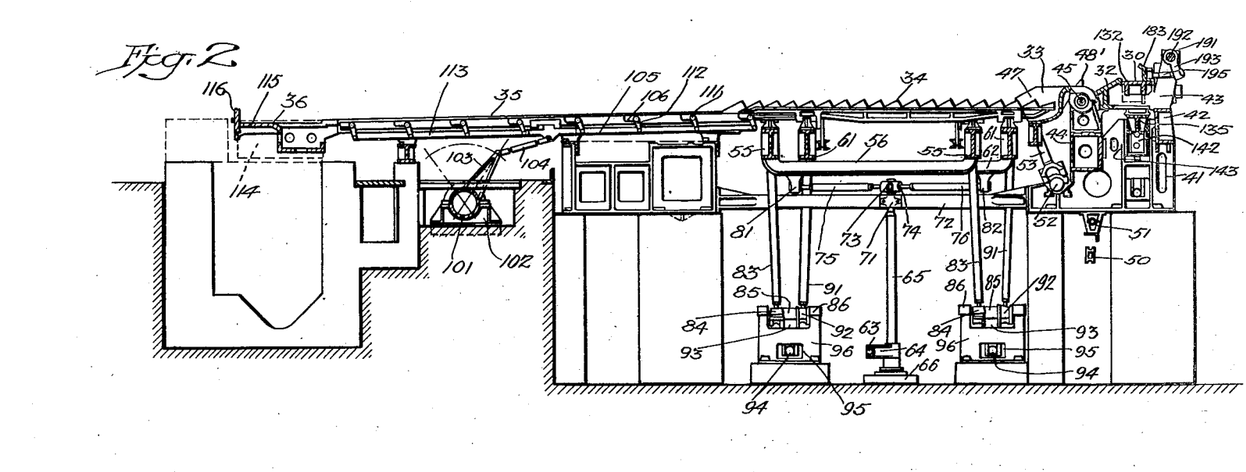
Figure 2 is a section of Figure 1 on the line 2—2.

The first set of cooling bed bars 34 are divided into two groups respectively supported on beams 55 connected by cross beams 56 and by beams 61 connected by cross beams 62. The respective groups of cooling bed bars are horizontally oscillated oppositely by a rod 63 (Figure 2) acting on a crank 64 to rock a vertical shaft 65 on bearings 66, 71, the latter supported in a stationary brace 72. On the opposite end of the shaft 65 I provide opposite cranks 73 connected to pull rods 75, 76, respectively, which are respectively connected to the cross beams 56, 62 by socket joints 81, 82.

Concurrently with the horizontal longitudinal movement of the groups of cooling bed bars, vertical movement is provided by rods 83 working on cranks 84 on shafts 85 in bearings 86, connected pivotally by means not shown to the opposite ends of cross beams 56, and by rods 91 operated by opposite cranks 92 on shafts 85 and pivotally connected to the opposite ends of cross beams 62 by means not shown. The shafts 85 are suitably rocked by cranks 93 manipulated by pull rods 94 extending through recesses 95 in the bearing supports 96, through any suitable mechanism not shown.

The remaining series 35 of cooling bed bars are preferably not notched as in the case of the series 34, but are manipulated in groups by a shaft 101 mounted on bearings 102 carrying two sets of angularly spaced cranks 103 (only one of which is shown) connected to the respective groups of bars 35 by connecting rods 104. The bars in this case slide on any suitable guides 105 and are provided with suitable projections pivoted at 111 and having bellcrank-like arms 112 interconnected to rods 113 for erection of the projections above the surface of the bars 35 when required, to provide projections for gripping the stock as it moves on the cooling bed.

The discharge table 36 suitable includes rolls 114, an apron 115 and side guards 116.

It will be evident that all of the above mechanism except the approach table may be regarded as conventional for the purposes of the present invention.

The approach table proper of the present invention comprises a set of substantially horizontal approach rollers 121 rotating on shafts 122 and driven by motors 123 suitably electrically interconnected as well known in the art.

Figure 8:
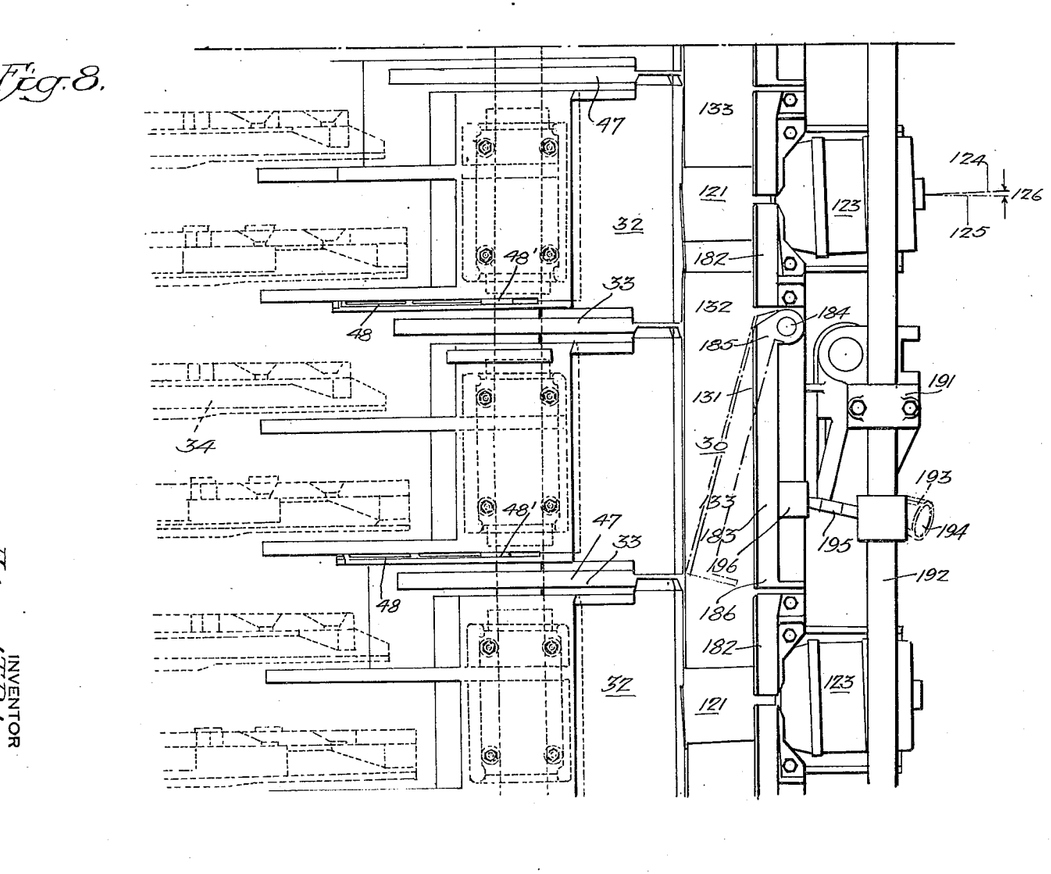
Figure 8 is a fragmentary top plan view of Figure 7.

As illustrated in Figure 8, the roller axes are preferably not exactly transverse to the length of the approach table, but are slightly axially inclined toward the side of the table having the guards and kick-off arms later to be described, in order that by a lateral component of the forward motion, the stock may be urged toward that side during the longitudinal approach movement, so that it can be readily engaged by the kick-off arms during kick-off. To illustrate this fact, I show in Figure 8 an axis 124 of the roller and motor and a line 125 perpendicular to the length of the approach table, with a slight angle 126 between the same, the inclination of the axis of the roller being toward the side 131 of the approach table. Suitably positioned longitudinally of the approach table between the rollers, I provide an apron 132 made up of apron plates 133 supported on beams 134 of an apron frame 135.

Figure 6:
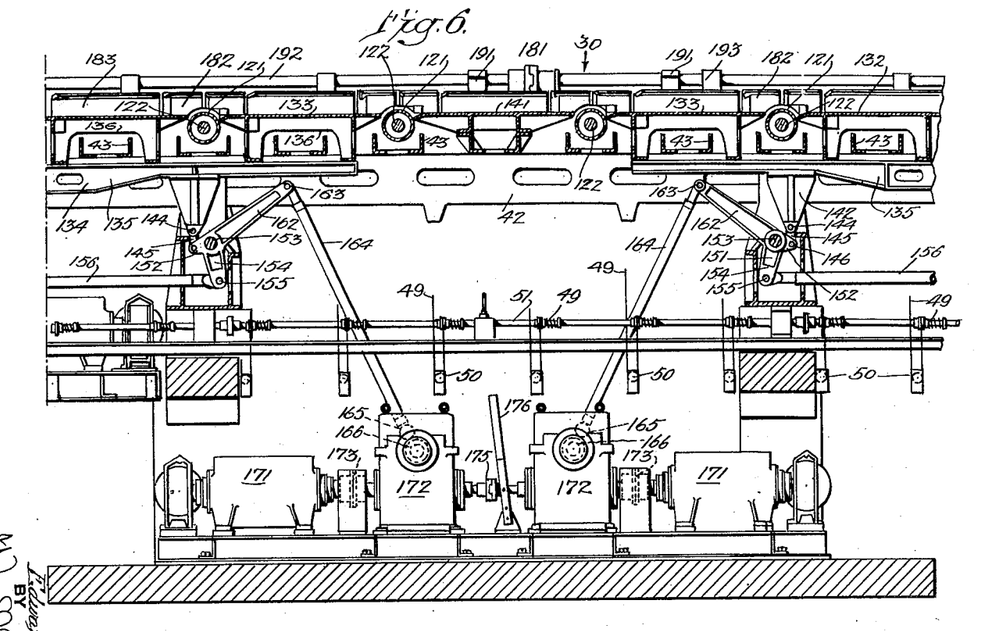
Figure 6 is a section on the line 6—6 of Figure 5.

While, if desired, a single apron frame may perform the functions required, it is preferable to use a plurality of apron frames, each carrying a portion of the apron plates 133 as shown in Figure 6.

The structure of the apron plates is suitably recessed at 136 transversely of the approach table to permit extension of parts of the saddles 43 across from side to side of the approach table, and the recesses at 136 are suitably made amply large so that the saddles and related structure will not interfere with vertical movement of the apron frame and aprons later to be described. If desired, suitable stationary apron plates 141 may be interposed between the apron plates 133 supported on the apron frames (Figure 6), and these are supported on the beams 42.

The normal position of all of the apron plates as shown is below the tops of the approach table rollers, and the stationary apron plates 141 of course do not move from this position. However all other apron plates 133 supported on the apron frames are suitably vertically movable and guided during vertical movement by guides 143 in guideways 143 suitably mounted in the main frame 41, the guides 142 carrying the beams 134 of the apron frames 135. On the lower ends of the guides 142 I provide pivots 144 for links 145 making pivotal connection at 146 with bellcranks 151. Bellcranks 151 have lever arms 152 engaging the links and are mounted on shafts 153 in suitable bearings not shown.

Figure 7:
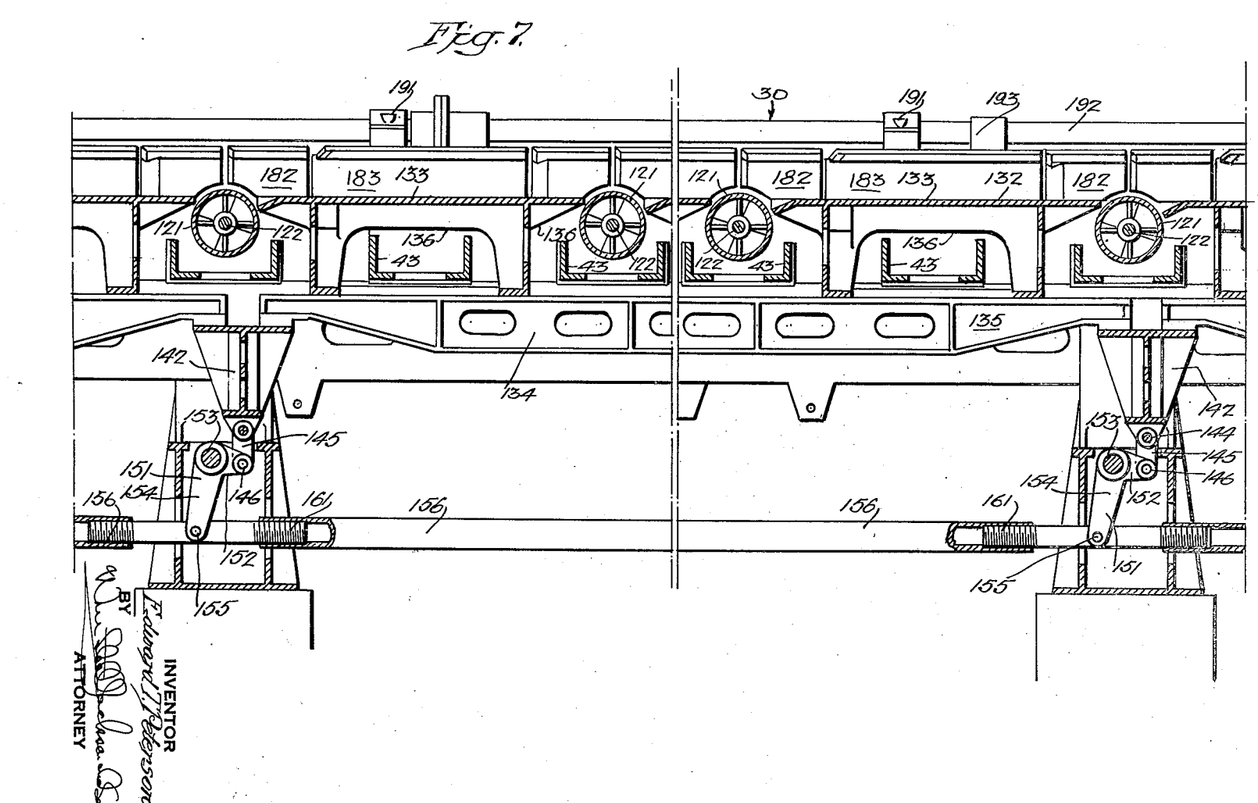
Figure 7 is a very much enlarged fragmentary longitudinal section corresponding to a portion of Figure 4.

The opposite lever arms 154 are pivotally connected at 155 to connecting rods 156, one for each apron frame, and suitably running longitudinally of the approach table as shown. The connecting rods may suitably be made adjustable at 161 as illustrated in Figure 7. There will preferably be one set of links, bellcranks and connecting rod attachments for each guide and guideway, and the connecting rods will suitably extend from end to end of each apron frame.

Suitably at the center of the approach table, or at convenient points at the ends of each apron frame as shown in Figure 6, I provide on the shafts 153 actuating levers 162 making pivotal connection at 163 with actuating rods 164 pivotally connected at 165 to cranks 166 driven by motors 171 through speed reducers 172 coupled to the motors at 173. The motors are provided with limit switches 174 to control their stroke, and the speed reducers for adjoining apron frames are oppositely interclutched at 175 under the control of the clutch throw-out lever 176.

The mechanism for kick-off is located chiefly at the side 131 of the approach table, and is operative in elevated or depressed position of the apron, but will be preferably used when the apron has been raised to take the stock off the approach rollers and brake the forward movement of the stock by the friction of the apron and the removal of the contact with the rollers which causes forward progression. Also suitably at the edges of the apron plates 133 overhanging the approach rollers vertically movable guards 182 are preferably provided.

Kick-off arms 183 have an inactive position at the side 131 in line with the guards and an active position extending across the approach table as indicated by the dot-and-dash lines in Figure 8.

Kick-off arms 183 are pivoted adjacent one end on suitably vertical pivots 184 (Figure 8), mounted on the apron frames and conveniently carried by the apron plates. The pivots 184 are preferably adjacent the rearward ends 185 of the kick-off plates with respect to stock travel, so that when the kick-off plates swing to kick-off position the plates will be extending diagonally across the approach table from the line of the guards 182 at the pivots to a line approximating the other edge of the table at the free ends 186, as shown in dot and dash lines in Figure 8. Thus, if the stock has forward motion at the time it strikes a kick-off plate, the end of the stock will be deflected off the table at the side, and will not dig or grab under or behind the kick-off plate as would be the case if the kick-off plates were oppositely pivoted.

At suitable positions along the saddles 43 bearings 191 are mounted for a kick-off shaft 192 extending longitudinally of the approach table and to the guard side thereof.

Figure 9:
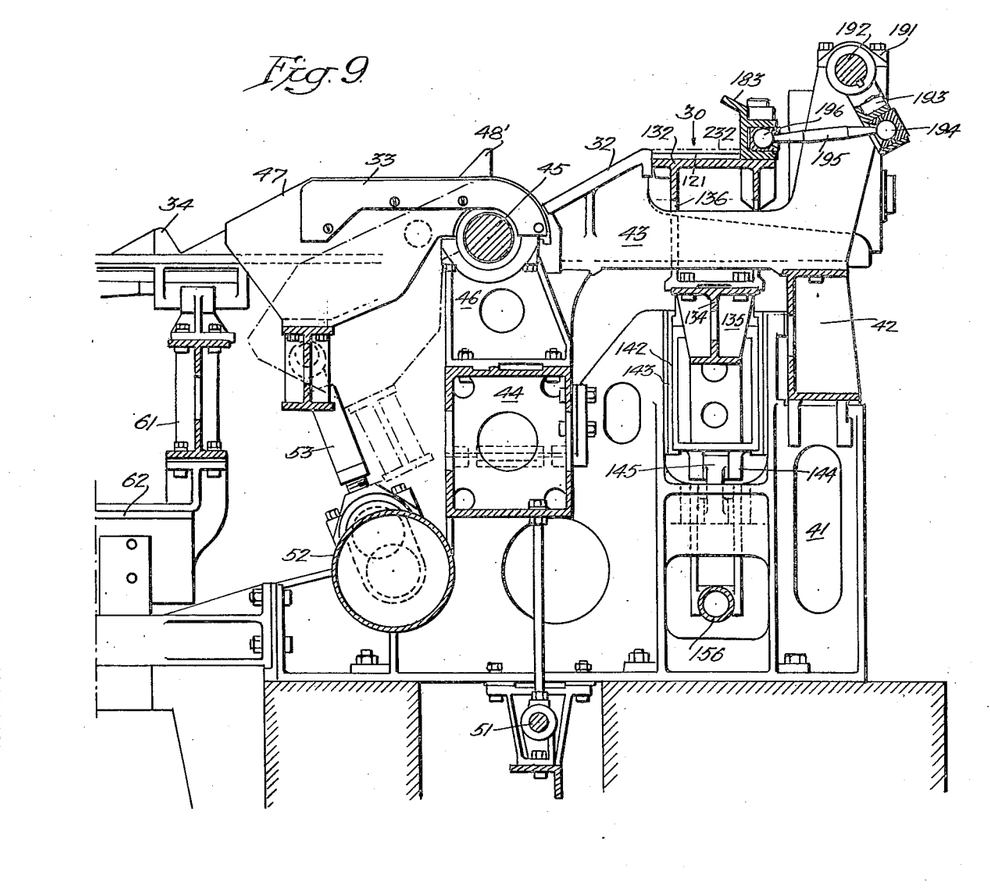
Figure 9 is a much enlarged fragmentary transverse section corresponding to a portion of Figure 2, but with the universal joints sectioned.

The kick-off shaft 192 has, at positions corresponding to the free ends of each kick-off arm, kick-off levers 193 which make universal joint or ball and socket connection at 194 with push rods 195 making universal joint or ball socket connection at 196 with the kick-off arms 183 near their free ends, as best seen in Figures 8 and 9.

The importance of this construction will be evident when it is appreciated that the ball and socket joints 196 between the push rods and the kick-off arms move up and down with the movement of the aprons and apron frames; while the ball and socket joints 196 move laterally or in a horizontal plane during the kick-off motion of the kick-off arms. Both of these components of motion are provided for by the horizontal and vertical freedom in the ball and socket joints 193 and 196 at the two ends of the push rods.

It will be evident, of course, that when the kick-off shaft 192 is rocked in the clockwise direction in Figure 9, all of the kick-off arms as a group are thrown into kick-off position, regardless of whether the apron is at that time elevated above the surface of the approach rollers, or depressed below the tops thereof.

Figure 3:
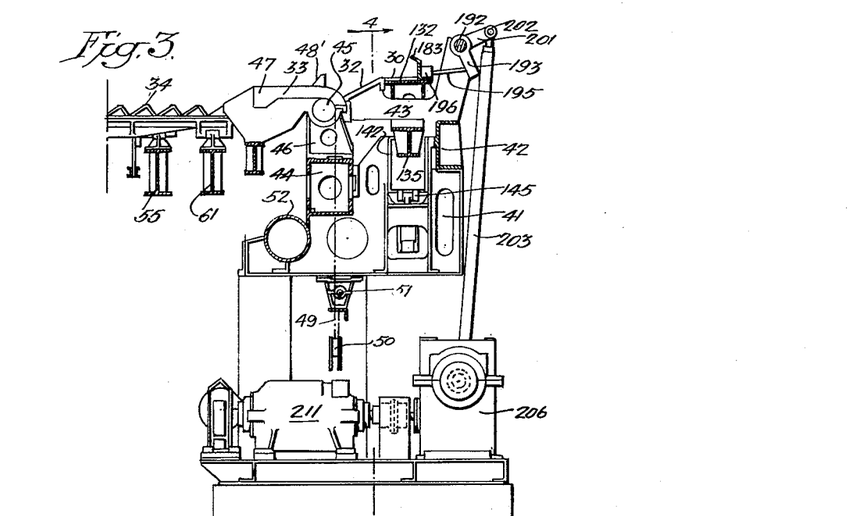
Figure 3 is an enlarged fragmentary section corresponding to the right hand end of Figure 2, the section being taken on the line 3—3 of Figure 4.
Figure 4:
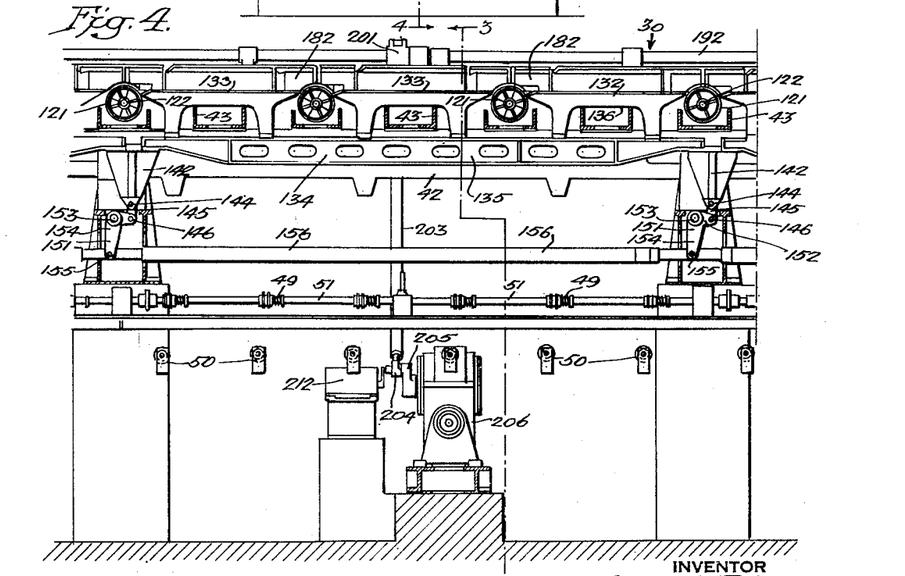
Figure 4 is a fragmentary section on the line 4—4 of Figure 3.

Actuation of the kick-off shaft 192 is conveniently accomplished as shown in Figures 3 and 4 by a crank 201 on the kick-off shaft making pivotal connection at 202 to a pull rod 203 pivotally connected at 204 to a crank 205 driven by a speed reducer 206 operated by an electric motor 211 and controlled as to length of stroke by a limit switch 212.

Figures 10, 11:
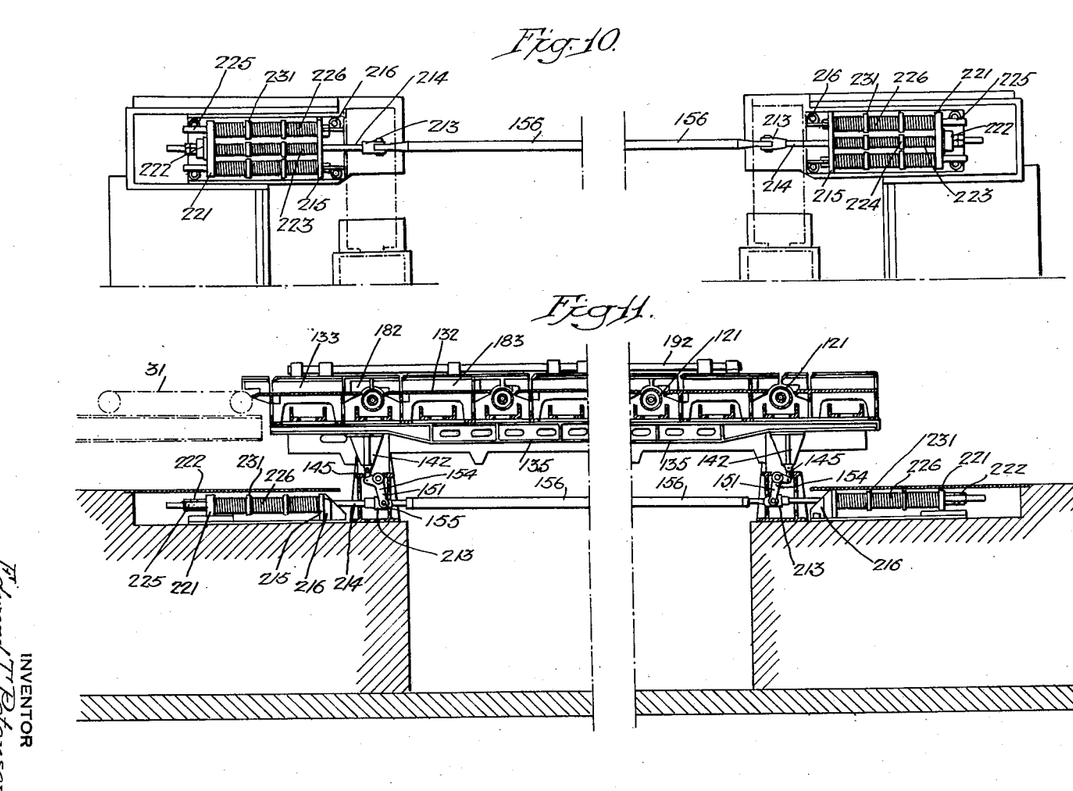
Figure 10 is a fragmentary sectional plan view omitting all the approach table structure thereabove to show the counterweight construction at the two ends of the approach table.
Figure 11 is a fragmentary longitudinal section corresponding to Figure 4, but to reduced scale and omitting the intermediate structure of the approach table to show the counterweighting construction at the ends.

The structure may be quite heavy and accordingly it is desirable to counterweight in order to reduce the load carried by the electric motors in lifting the apron frames and the associated structure. Figures 10 and 11 show convenient mechanism for accomplishing this function, desirably located at the extreme ends of the approach table, and each counterweighting mechanism operating independently on a different frame. Thus it will be understood that each of the connecting rods shown in Figures 10 and 11 on opposite sides of the break in the centers of the figures is a different connecting rod, and that the connecting rods and apron frames do not extend across the center portion omitted by breaking the views.

At the end of each connecting rod and acting on the pivot 155 between each connecting rod 156 and the corresponding bellcrank, I suitably provide a clevis 213 which is fastened to a spring pull rod 214 extending through an opening in a spring abutment 215 secured at 216 to the base structure. The pull rod 214 extends through an opening in a spring push plate 221 and is adjustably secured beyond the spring push plate by suitable take-up nuts 222.

Surrounding the pull rod 214 between the spring abutment 215 and the spring push plate 221 I provide springs 223 separated by spacers 224. Spring guiding rods 225 extend between the spring abutment 215 and the push plate, being suitably fastened to the abutment and extending freely through openings in the push plate. As seen in Figure 10, the rods 225 are suitably parallel to the pull rod 214 and one on either side of the pull rod. Springs 226 surround the spring guide rods 225 and are separated by separators 231. The springs 223 and 226 are suitably compression springs which are adjusted by the nuts 222 to maintain some precompression at all times and in the lower positions of the frames to provide sufficient tension on the pull rods 214 to substantially counterbalance the weights of the aprons and apron frames, with associated structure. As the aprons are raised to their positions above the level of the approach rollers, the compression of the springs is reduced, but a substantial portion of the load is borne by the springs in elevated position also, thus reducing the energy to be supplied by the elevating motor.

In Figures 12 to 16 inclusive a preferable alternate form of kick-off bar and apron plate construction is shown, which is particularly well suited to kick-off comparatively thin stock or stock having a small vertical dimension above the apron plates in raised position. It is difficult to obtain such close fitting between the tops of the apron plates and the lower edges of the kick-off arms as to prevent the kick-off arms in some instances from passing over the top of the stock without effecting kick-off, especially where the apron plates become worn in the area 240 adjacent the kick-off arms when in active position. This condition becomes particularly aggravated when a substantial groove is worn at 240 in the apron plates.

Figure 12:
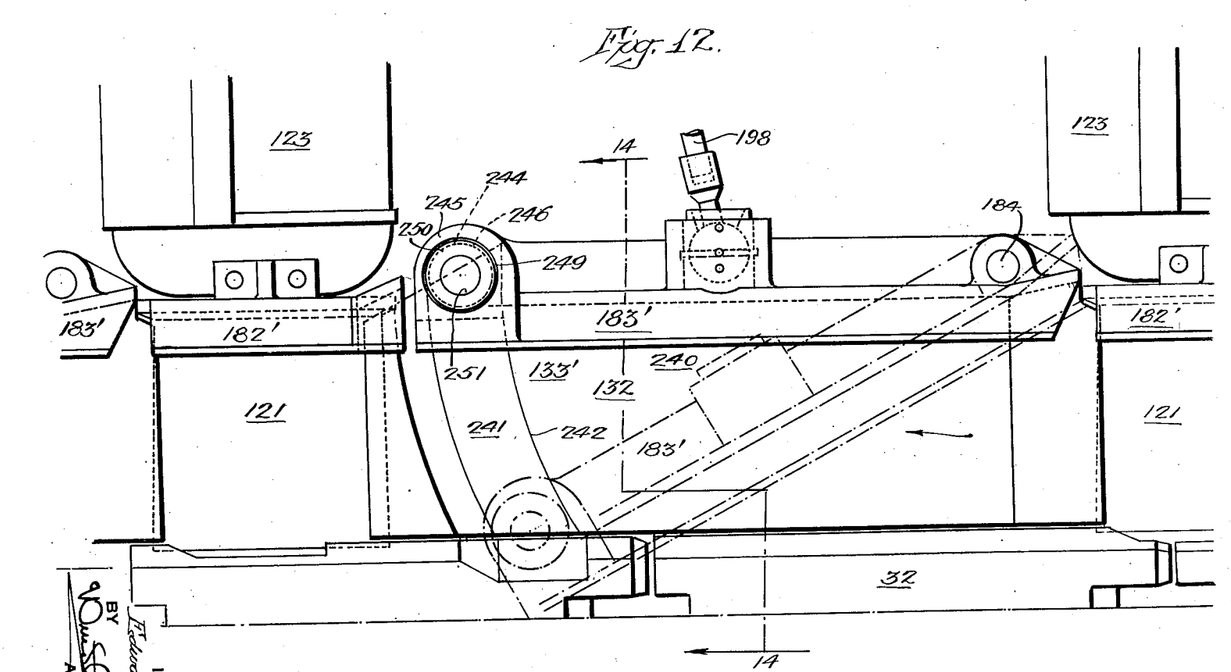
Figure 12 is an enlarged top plan view showing the kick-off arms in two positions. This view corresponds in position to Figure 8, but is arranged for stock moving from right to left, instead of from left to right, as in Figure 8.
Figure 13:
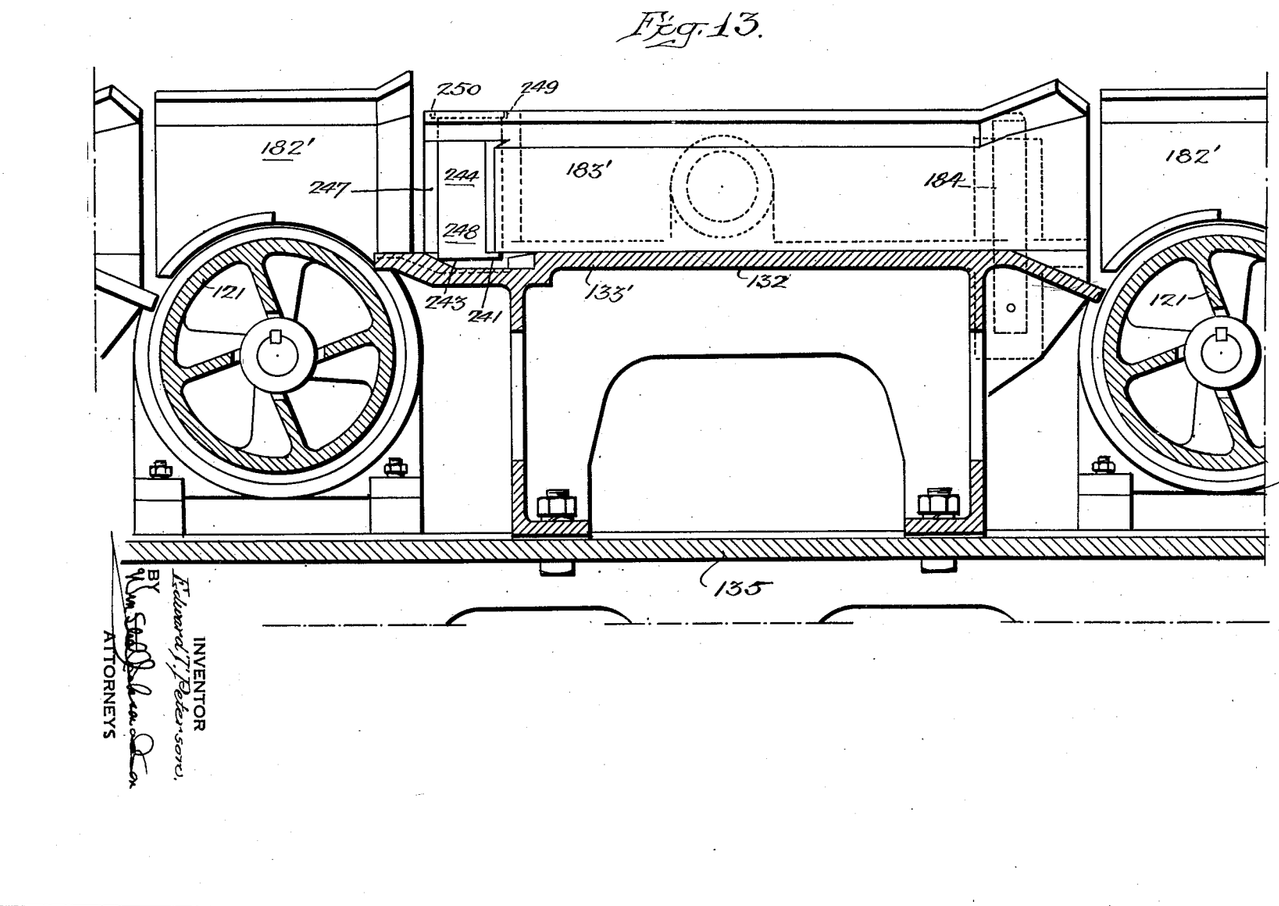
Figure 13 is a longitudinal section of Figure 12, corresponding in position with Figure 7, but enlarged with respect thereto, and arranged for stock moving from right to left.
Figures 14, 16:
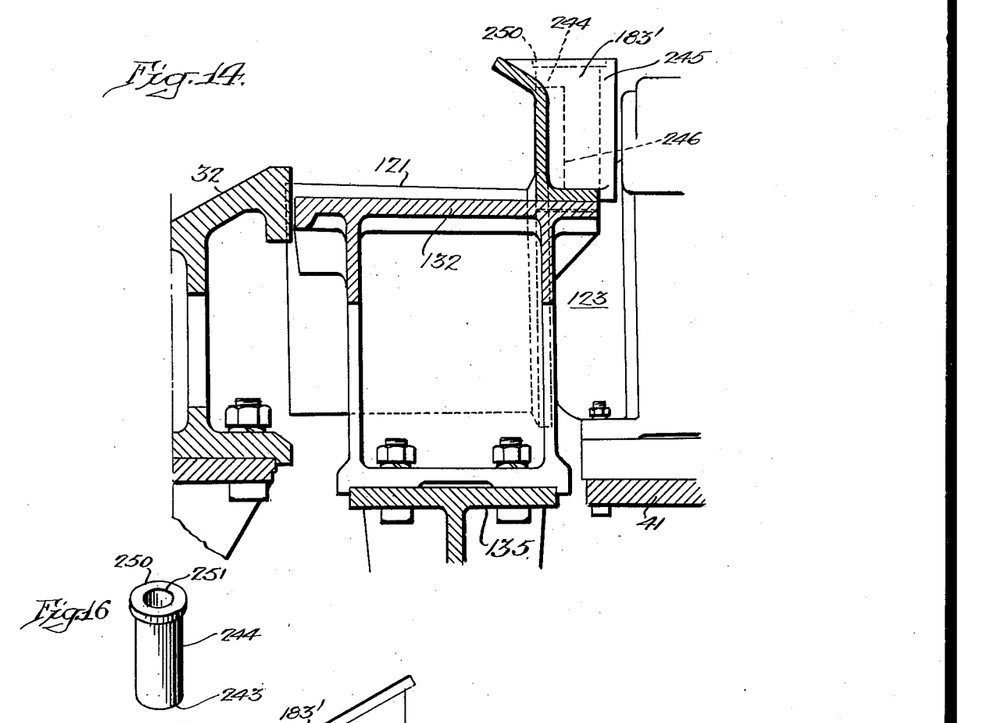
Figure 14 is a transverse section of Figure 12 taken on the line 14—14.
Figure 16 is a perspective of the removable insert.
Figure 15:
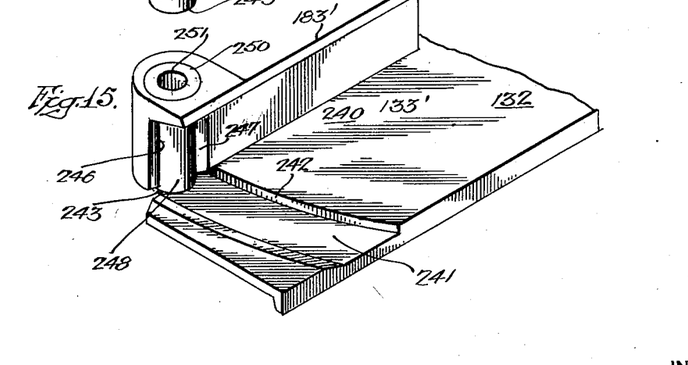
Figure 15 is a fragmentary perspective, showing a portion of the apron plate and kick-off arm.

I find that I can successfully overcome this difficulty by providing slots 241 in the apron plates 133' suitably of arcuate character as shown at 242, in Figures 12 and 15. The slots suitably receive downwardly extending ends 243 of preferably circular inserts 244, which are received in the enlarged ends 245 opposite to the pivots 184 on kick-off arms 183'. The enlarged ends 245 of the kick-off arms have vertical bores 246, which receive the inserts 244 and are machined away at 247 at the diagonal forward corners of the kick-off arms parallel to the tangent of the bore, but to a depth less than the center of the bore so as to expose a substantial curved section of the insert at 248 to the wear of the stock during kick-off.

A short counterbore 249 is provided at the top in the bore 246 in order to receive a flange 250 on the insert, which prevents the insert from moving too far down in the slot 241, thus avoiding wear against the bottom of the slot.

The inserts may be conveniently hollow at the center at 251.

It will be seen that since the insert is circular and free to rotate, the surface exposed to wear at 248 can change frequently, equalizing the wear on the insert and at the same time reducing the wear between the insert and the stock by roller action of the insert against the stock.

In the variation of Figures 12 to 16 inclusive the guides 182' are stationary and supported on the motors 123 instead of moving up with the apron plates as in the other form.

In operation of the device when stock enters the approach table and travels longitudinally thereof, it is carried in the normal manner on the approach table rollers until the point of kick-off is approached. The angular position of the axes of the approach table rollers assures that the stock is brought close to the side 131 where the kick-off arms are located.

Actuation of the motor to elevate the approach table apron on the apron frames picks up the stock and lifts it from the rollers as the apron moves to its elevated position above the level of the rollers as indicated, for example, by the dot-and-dash line 232 in Figure 9. The effect of elevating the stock above the level of the rollers is to terminate the forward progression caused by the rollers and brake the stock, against forward progression, by the friction of the apron. At any time, simultaneously with this elevation of the apron, or subsequent thereto, the motor operating the kick-off arms is actuated, swinging the kick-off shaft, kick-off levers, and push rods, and causing the kick-off arms to swing across the approach table, pushing the stock laterally until it rests upon the inclined guides 32. The stock will then normally slide down the guides 32 and be carried along its course by the other elements of the cooling bed such as the grate bars 33, the dogs 48, the two sets of cooling bed bars 34 and 35 and finally will be removed by the discharge table 36.

The operation of the form of Figures 12 to 16 inclusive will be the same as that already described, except that, when the apron is raised and the kick-off arms are actuated, the stock will first come in contact with the flat side walls of the kick-off arms 183', but, as soon as the kick-off arms have swung a substantial distance, the stock will come in contact with the inserts 244, being pushed by the curved side portions of the inserts. The inserts are on the forward ends of the kick-off arms with respect to the direction of motion of the stock. The extensions of the inserts below the level of the apron into the slots 241 will assure kick-off of even the thinnest stock. Equality of wear will be assured and friction will be reduced by the fact that the inserts are circular and can function as rollers to turn if the stock is not fully stopped in longitudinal motion by the time it contacts them.

It will be evident that by my invention it is possible to control the position of the stock more accurately and to simplify the construction of approach tables, often eliminating unnecessary length allowed to take care of uncertainty in kick-off point.

In view of my invention and disclosure variations and modifications to meet individual whim or particular need will doubtless become evident to others skilled in the art, to obtain all or part of the benefits of my invention without copying the strucure shown, and I, therefore, claim all such insofar as they fall within the reasonable spirit and scope of my claims.

Having thus described my invention, what I claim as new and desire to secure by Letters Patent is:

1. In an approach table, a set of approach rollers for transfer of stock, means for driving the approach rollers, an approach apron positioned between the approach rollers and having an inactive position below the tops of the approach rollers, means for raising the approach apron to a position above the tops of the approach rollers, kick-off means moving up with the approach apron, kick-off driving means remaining axially stationary as the approach apron rises and kick-off driving connections between the axially stationary kick-off driving means and the kick-off means for maintaining driving connection with the kick-off means in the elevated position of the approach apron.

2. In an approach table, a set of approach rollers, means for driving the approach rollers, an apron between the rollers having an inactive position below the tops of the rollers, side guards at one side of the apron and rollers, the axes of the rollers being inclined with respect to the length of the table toward the side guards, means for elevating the apron to an active position above the level of the rollers and kick-off means at the line of the side guards moved upwardly by the means for elevating the apron, and swinging outwardly from the line of the side guards.

3. In an approach table, a set of approach rollers, means for driving the approach rollers, a frame extending longitudinally of the table below the tops of the approach rollers, means for raising and lowering the frame, an apron extending longitudinally of the table between the rollers, mounted on the frame, and having an inactive position below the tops of the rollers, kick-off arms vertically pivoted at one side of the approach table, an axially stationary kick-off shaft extending longitudinally of the approach table, crank arms on the shaft and push rods making universal joint connections with the crank rams and the kick-off arms to permit vertical movement of the kick-off arms as the frame is raised and lowered, and to permit swinging of the push rods when the kick-off arms are moved into kick-off position.

4. In an approach table, a set of approach rollers axially inclined toward one side of the table, means for driving the approach rollers, a frame extending longitudinally of the table below the tops of the rollers, an apron supported on the frame between the rollers and having an inactive position below the tops of the rollers, guards on the side of the approach table to which the axes of the approach rollers are inclined, kick-off arms interspersed among the guards on the same side of the table, pivotally supported from the frame and movable across the aprons into kick-off position, means for raising and lowering the frame and crank means for swinging the kick-off arms in elevated position of the frame.

5. In an approach table, a set of approach rollers axially inclined toward one side of the table, means for driving the approach rollers, a frame extending longitudinally of the table below the tops of the rollers, an apron supported on the frame between the rollers and having an inactive position below the tops of the rollers, guards on the side of the approach table to which the axes of the approach rollers are inclined, kick-off arms interspersed among the guards on the same side of the table, pivotally supported from the frame and movable across the aprons into kick-off position, means for raising and lowering the frame, and axially stationary kick-off shaft running longitudinally of the table, kick-off crank arms on the shaft and push rods making universal joint connection between the crank arms and the kick-off arms.

6. In an approach table, a set of approach rollers for transfer of stock, means for driving the approach rollers, an apron having spaced slots in its upper surface, having an inactive position between the approach rollers and below the tops thereof, means for raising the apron above the inactive position, kick-off arms having extensions which in their active position move in the slots, vertical pivotal support of the kick-off arms on the apron, and means for moving the kick-off arms to kick-off stock from the apron.

7. In an approach table, a set of approach rollers, means for driving the approach rollers, a frame extending longitudinally of the table below the tops of the approach rollers, means for raising and lowering the frame, an apron extending longitudinally of the table between the rollers, mounted on the frame, having an inactive position below the tops of the rollers and having slots extending across its top surface at intervals, kick-off arms vertically pivoted at one side of the approach table, extensions from the kick-off arms into the slots, an axially stationary kick-off shaft extending longitudinally of the approach table, crank arms on the shaft and push rods making universal joint connections with the crank arms and kick-off arms to permit vertical movement of the kick-off arms as the frame is raised and lowered, and to permit swinging of the push rods when the kick-off arms are moved into kick-off position.

8. In an approach table, a set of approach rollers for transfer of stock, means for driving approach rollers, an apron having an inactive position between the approach rollers and below the tops thereof, means for raising the apron above its inactive position, kick-off arms at one side of the apron vertically pivoted to the apron at the rearward ends of the kick-off arms with respect to the direction of motion of the stock, replaceable wear inserts in the kick-off arms at the ends opposite to the pivots and means rising with the apron for operating the kick-off arms when the apron is raised.

9. In an approach table, a set of approach rollers, means for driving the approach rollers, a frame extending longitudinally of the table below the tops of the approach rollers, means for raising and lowering the frame, an apron extending longitudinally of the table between the rollers, mounted on the frame, having an inactive position below the tops of the roller, kick-off arms vertically pivoted at one side of the table and at the rearward ends of the arms with respect to the direction of motion of the stock, removable inserts having wear surfaces exposed to the stock at the ends of the arms opposite to the pivots, an axially stationary kick-off shaft extending longitudinally of the approach table, crank arms on the shaft and push rods making universal joint connections with the crank arms and the kick-off arms to permit vertical movement of the kick-off arms as the arms are raised and lowered and to permit swinging of the push rods when the kick-off rods are moved into kick-off position.

10. In an approach table, a set of approach rollers for transferring stock, means for driving the approach rollers, an apron having an inactive position between the approach rollers and below the tops thereof, and having generally transverse slots at intervals along the length, kick-off arms vertically pivoted on the apron having inactive positions at one side thereof, circular inserts in the ends of the kick-off arms which contact the work in active position, extending into the slots below the kick-off arms and capable of turning about vertical axes, means for raising the apron above its inactive position and means rising with the apron for operating the kick-off arms.

11. In an approach table, a set of approach rollers, means for driving the approach rollers, a frame extending longitudinally of the table below the tops of the approach rollers, means for raising and lowering the frame, an apron extending longitudinally of the table between the rollers, mounted on the frame, having a plurality of generally transverse slots in its upper surface at intervals along the length and having an inactive position below the tops of the rollers, kick-off arms vertically pivoted at one side of the apron at the ends of the kick-off arms which are rearwardly with respect to the direction of motion of the stock, circular inserts on vertical axes mounted at the ends of the kick-off arms which are forwarded with respect to the direction of motion of the stock, having side surfaces exposed to contact of the stock, capable of being turned in their mounting in the kick-off arms, extending down into the slots and their lower ends moving in the slots, an axially stationary kick-off shaft extending longitudinally of the approach table, crank arms on the shaft and push rods making universal joint connections with the crank arms and the kick-off arms to permit vertical movement of the kick-off arms as the frame is raised and lowered and to permit swinging of the push rods when the kick-off arms are moved into kick-off position.

12. In an approach table, a set of approach rollers, means for driving the rollers, an apron having a flat longitudinally extending upper portion having a normal position between the rollers and below the level of the rollers and having an active position above the rollers in position to act as a drag against the longitudinal motion of the stock along the rollers, kick-off arms having inactive positions along the approach table at one side thereof and being pivoted adjacent the rearward ends with respect to the longitudinal forward movement of the stock, means for raising the apron to a position above the level of the rollers and means acting while the aprons are in raised position for swinging the kick-off arms about their pivots into contact with the stock to accomplish kick-off as the stock drags on the apron.

EDWARD T. PETERSON.

REFERENCES CITED

The following references are of record in the file of this patent:

UNITED STATES PATENTS

| Number | Name | Date |
|---|---|---|
| 752,444 | Esselius | Feb. 16, 1904 |
| 921,165 | Ross | May 11, 1909 |
| 1,762,291 | Fors | June 10, 1930 |
| 2,043,556 | Protin | June 9, 1936 |
| 2,057,131 | Barton et al. | Oct. 13, 1936 |